United States Patent
Goto et al.

(10) Patent No.: US 7,335,249 B2
(45) Date of Patent: Feb. 26, 2008

(54) WATER BASE INK SET FOR INK-JET RECORDING

(75) Inventors: Kazuma Goto, Nagoya (JP); Narumi Koga, Nagoya (JP); Hideto Yamazaki, Nagoya (JP); Masaya Fujioka, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 373 days.

(21) Appl. No.: 11/108,635

(22) Filed: Apr. 19, 2005

(65) Prior Publication Data

US 2005/0235868 A1 Oct. 27, 2005

(30) Foreign Application Priority Data

Apr. 26, 2004 (JP) .............................. 2004-130309

(51) Int. Cl.
*C09D 11/02* (2006.01)
*B41J 2/01* (2006.01)

(52) U.S. Cl. ................. 106/31.27; 106/31.28; 106/31.58; 106/31.43; 106/31.75; 106/31.86; 347/100

(58) Field of Classification Search ............. 106/31.27, 106/31.28, 31.58, 31.86, 31.43, 31.75; 347/100
See application file for complete search history.

(56) References Cited

U.S. PATENT DOCUMENTS

| | | | |
|---|---|---|---|
| 5,745,140 A | 4/1998 | Stoffel et al. ................ 347/100 |
| 5,958,121 A | 9/1999 | Lin ........................... 106/31.43 |
| 6,386,695 B1 | 5/2002 | Kowalski ..................... 347/100 |
| 6,758,889 B2 | 7/2004 | Koga et al. ............... 106/31.43 |
| 6,866,377 B2 * | 3/2005 | Kawamura et al. ......... 347/100 |
| 6,921,429 B2 * | 7/2005 | Sago et al. ............... 106/31.43 |
| 7,014,695 B2 * | 3/2006 | Koga et al. ............... 106/31.43 |
| 7,159,976 B2 * | 1/2007 | Kawamura et al. ......... 347/100 |
| 2003/0179268 A1 | 9/2003 | Koga et al. |
| 2004/0227800 A1 * | 11/2004 | Ohira et al. ................. 347/100 |
| 2006/0048672 A1 * | 3/2006 | Sugimoto et al. ......... 106/31.27 |

FOREIGN PATENT DOCUMENTS

| | | |
|---|---|---|
| JP | A-11-323225 | 11/1999 |
| JP | A 2000-281948 | 10/2000 |
| JP | A-2002-173623 | 6/2002 |
| JP | A-2002-285048 | 10/2002 |
| JP | A 2003-268268 | 9/2003 |

\* cited by examiner

*Primary Examiner*—Helene Klemanski
(74) *Attorney, Agent, or Firm*—Oliff & Berridge, PLC

(57) ABSTRACT

A water base ink set for ink-jet recording includes a black ink containing a negatively charged self-dispersing black pigment and a water-soluble polyvalent alcohol alkyl ether; and a yellow ink containing a water-soluble anionic yellow dye in which a number of counter ion or ions per one molecule is not more than 3, a surfactant based on amine represented by the following general formula (1), and a water-soluble polyvalent alcohol alkyl ether;

$$R\text{—}N\text{—}(CH_2CH_2O)_xH(CH_2CH_2O)_yH \qquad (1)$$

wherein R represents an alkyl group or an alkenyl group having a number of carbons of 8 to 18, and x+y is 5 to 15. Accordingly, the water ink set in which no bleeding or no coagulation of the pigment occur is provided.

14 Claims, No Drawings

WATER BASE INK SET FOR INK-JET RECORDING

BACKGROUND OF THE INVENTION

1. Field of the Invention

The present invention relates to a water base ink set for ink-jet recording in which both of an image with the vividness of color possessed by a dye ink and an image with high density and high contrast possessed by a pigment ink are satisfied, and in which no coagulation of pigment and no bleeding occur.

2. Description of the Related Art

In the ink-jet printing system, ink droplets are formed by the ink discharge system including, for example, the electrostatic attraction system, the system in which mechanical vibration or displacement is applied to the ink by using a piezoelectric element or the like, and the system in which bubbles are generated by heating the ink to utilize the pressure generated thereby. All or a part of the ink droplets are adhered to a recording objective material such as paper to perform the printing.

The coloring agent used in a water base ink for ink-jet recording includes dye and pigment. The dye used in the water base ink for ink-jet recording may include, for example, acid dye, direct dye and reactive dye. A water base ink for ink-jet recording in which a dye is used as the coloring agent has characteristics that the image, obtained by using the ink, is vivid or bright in color as well as the ink is easy to handle for the following reason. That is, since the dye is dissolved in an ink solvent medium or ink solvent used for the ink at the molecular level, the dye behaves in the same manner as the ink solvent and is capable of permeating into the paper. On the other hand, there is a problem associated with the dye ink that the ink nonuniformly spreads along the paper surface when the ink permeates into the paper. As a result, the edge of an image area or a line area tends to become jaggy and it is not possible to obtain an image area or a line area with sharp edge.

The pigments used in the water base ink for ink-jet recording are generally classified into a dispersing agent-aided dispersion pigment with which a dispersant agent of a surfactant and a resin are used, and a self-dispersing pigment in which a surface oxidation treatment and a chemical bonding treatment are applied to the pigment particles so that the pigment can be dispersed in the ink solvent without using any dispersing agent. The self-dispersing pigment is presently used in many cases since the dispersion state is hardly deteriorated even when additives are used in the ink. The water base ink for ink-jet recording using a pigment as the coloring agent has characteristics that an image with sufficiently high density and high contrast can be obtained for the following reason. That is, the pigment is dispersed in the ink solvent rather than being dissolved in the ink solvent. Accordingly, the pigment particles are prohibited from movement (permeation), for example, by the additives and the fibers contained in the paper. Therefore, the amount of the pigment remained on the paper surface is increased. On the other hand, even the ink containing the self-dispersing pigment as the coloring agent involves a problem that since the dispersion of the pigment tends to be unstable by the salts or the like, the pigment is difficult to handle; and light is diffusely reflected by the pigment particles on the paper surface and inside of the paper so that an image with vivid color is hardly obtained.

In view of the above problems, a method is known in which a pigment as the coloring agent of black ink and a dye as the coloring agent of color ink are used in combination in order to satisfy both of the visibility (visual recognition performance) of the letters printed with the black ink and the vividness of color portions printed with the color ink. For example, U.S. Pat. No. 5,745,140 discloses a water base ink set for ink-jet recording in which a black ink using a black pigment such as carbon black as the coloring agent and a color ink using a dye as the coloring agent are used in combination.

However, such a combined use of the pigment ink and the dye ink involves a problem that the pigment and dye inks contact with each other and mix with each other to cause coagulation which in turn causes the clog-up of ink head or the like. The reason is considered that cations, included in the color ink containing an anionic dye, bond to the surface of the self-dispersing pigment which is generally charged to have a negative electric charge, thus the charge of the pigment is cancelled and the electric repulsive force of the pigment is lost. In addition, it is considered that a solvent shock, which is caused by the contact of pigment ink with the dye ink, occurs to destabilize the dispersion of the pigment and cause the coagulation.

Further, the combined use of the pigment ink and dye ink also involves the problem of bleeding. The bleeding refers to such a phenomenon that the printing quality deteriorates at a portion in which different colors are adjacent to each other (hereinafter referred to also as a boundary portion). In particular, the bleeding between a black ink and a yellow ink, which differ greatly from each other in lightness and darkness, causes a problem. As the method for suppressing the bleeding, for example, U.S. Pat. No. 6,758,889 corresponding to Japanese Patent Application Laid-open No. 2002-285048 discloses a water base ink for ink-jet recording which uses the surfactant of a type added with alkylamine ethylene oxide. Such a water base ink for ink-jet recording is quite effective as long as used in combination with a dye ink. However, when a yellow dye ink containing alkylamine ethylene oxide and a black ink containing a self-dispersing pigment are used in combination, there is a problem that the dispersion of the pigment is deteriorated to cause the coagulation.

On the other hand, there has been conceived a water base ink set for ink-jet recording which utilizes the coagulation caused by the combined use of pigment ink and dye ink. For example, U.S. Pat. No. 6,386,695 corresponding to Japanese Patent Application Laid-open No. 2002-173623 discloses an ink set in which a first electric charge (anionic or cationic) is applied to a pigment black ink, and a second electric charge (cationic or anionic), which is opposite to the first electric charge, to a dye color ink to be used in combination with the black pigment ink. In this ink set, the black ink and the yellow ink which has opposite characteristic to that of the black ink are used in combination in order to intentionally make the pigments contained in the black ink coagulate on the paper surface when the black and color inks contact with each other, thereby momentarily preventing the pigment in the black ink from moving off a border with the color ink. As a result, a good anti-bleeding quality is obtained. However, in the ink set with such a combined use of the inks, there are the following problems caused by the coagulated pigments. That is, the coagulated pigments clog a nozzle; the coagulated pigments damage a repellent ink coat; the coagulated pigments adhere to a wiper and firmly fixed thereto, which in turn causes non-uniform wiping operation; the coagulated pigments adhere to a suction cap and firmly fixes thereto to lower the airtightness; the coagulated pigments adhere to and firmly fix to the inside of a suction pump, causing the operational failure or the like. In order to suppress to these inconveniences, it is necessary to elaborate the constitution of a printer itself in which the ink set is used. Accordingly, countermeasures for preventing the pigment and dye inks from mixing with each other in the vicinity of the nozzles are applied by providing a plurality of wipers; separating a head into a head for the pigment ink and a head for the dye ink; and providing a maintenance system for nozzles each for the pigment ink and for the dye ink. However, these countermeasures to elaborate the structure of the printer have not been practical because the cost for manufacturing the printer becomes higher.

SUMMARY OF THE INVENTION

The present invention has been made in order to solve the above problems, an object of which is to provide a water base ink set for ink-jet recording in which both of an image with vivid color or hue possessed by a dye ink and an image with high density and high contrast possessed by a pigment ink are satisfied, and in which no coagulation of pigment and no bleeding occur.

According to the present invention, there is provided a water base ink set for ink-jet recording including:
  a black ink containing a self-dispersing black pigment, which is dispersed in a solvent by having a negative charge, and a water-soluble polyvalent alcohol alkyl ether; and
  a yellow ink containing a water-soluble anionic yellow dye in which a number of counter ion or ions per one molecule is not more than 3, a surfactant based on amine represented by the following general formula (1), and a water-soluble polyvalent alcohol alkyl ether;
  wherein an amount of the self-dispersing black pigment contained in the black ink is 0.1 to 20% by weight; and
  an amount of the water-soluble anionic yellow dye contained in the yellow ink is 1 to 5% by weight, and an amount of the water-soluble polyvalent alcohol alkyl ether contained in the yellow ink is 2 to 5% by weight;

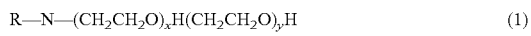
R—N—(CH$_2$CH$_2$O)$_x$H(CH$_2$CH$_2$O)$_y$H      (1)

wherein R represents an alkyl group or an alkenyl group having a number of carbons of 8 to 18, and x+y is 5 to 15. The present invention will be described in detail in the followings.

When the pigment ink and the dye ink contact with each other, a counter ion of the dye, which has a opposite polarity (opposite charge) to that of the pigment, adsorbs to the surface of the pigment which is dispersed in the ink by having a electrical charge, and the electric potential on the pigment surface is decreased. Even when the counter ion of the dye does not adsorb directly to the pigment surface, if an amount of counter ion(s) of the dye having the opposite polarity to that of the pigment is increased in the surroundings of the pigment, the electric charge on the pigment surface is neutralized, thereby decreasing the electric potential on the pigment surface. In this case, it is considered that, when the total amount of counter ions of the dye having the opposite polarity to that of the pigment exceeds a certain amount, the coagulating force becomes more conspicuous than the electrostatic repulsive force between the pigments, causing the pigments to rapidly coagulate with each other. Accordingly, it is considered that as the total amount of counter ions which are supplied by the dye and which have the opposite polarity to that of the pigment is smaller, the dispersion stability of the pigment becomes enhanced and the coagulation hardly occurs. However, when the concentration of dye is decreased in order to decrease the total amount of counter ions in the dye ink, there arises a problem such as the decrease in the color vividness and the color density on the paper surface. The inventors discovered through the diligent experiments and research that when an yellow ink containing a water-soluble anionic yellow dye in which a number of counter ion or ions per one molecule is not more than 3 is combined with a black ink containing a self-dispersing black pigment which has a negative charge when the pigment is dispersed in a solvent, both of an image with the color vividness by the dye ink and an image with high density and high contrast by the pigment ink are satisfied, and no coagulation of black pigment occurs even when these inks contact with each other. From the discovery, the inventors have completed the present invention. It is considered that with a water-soluble anionic yellow dye in which a number of counter ion or ions per one molecule is not more than 3, it is possible to realize a dye concentration having a color vividness or brightness which causes no problems in practical use to the extent not to lose the electrostatic repulsive force between the self-dispersing black pigments.

The black ink as described above contains the self-dispersing black pigment which is dispersed in a solvent by having a negative charge. As such a self-dispersing black pigment, any conventionally known self-dispersing black pigments may be used in which an oxidation treatment, a chemical binding treatment or the like is applied to introduce anionic functional group on the surface of the carbon black. By using such a black pigment which is dispersed in the solvent by having a negative charge, it is possible to select a later-described anionic dye as the water-soluble anionic yellow dye to combine with the black pigment. The commercially available self-dispersing black pigments includes, for example, CAB-O-JET 300, CAB-O-JET 200, CAB-O-JET 250, CAB-O-JET 260, CAB-O-JET 700 (respectively manufactured by Cabot), LIOJET WD BLACK 002C (manufactured by Toyo Ink, Ltd.), BONJET BLACK CW-1, BONJET BLACK CW-2, BONJET BLACK CW-3 (respectively manufactured by Orient, Ltd.). These self-dispersing black pigments may be used singly, or two or more of the pigments may be used in combination.

The content of self-dispersing black pigment in the black ink is 0.1 to 20% by weight as the pigment solid content with respect to the total amount of the ink. If the content is less than 0.1% by weight, then the color density becomes insufficient. If the content exceeds 20% by weight, the dispersion stability is lost, thereby causing the coagulation. The content is preferably 0.5 to 12% by weight and more preferably 2 to 8% by weight.

The black ink uses water as a solvent. Although there is no specific limitation to the water, it is preferable to use deionized water. The content of the water in the black ink is preferably 10 to 98% by weight with respect to the total amount of the ink. If the content is less than 10% by weight, then the viscosity of the ink becomes too high and a normal ink ejection cannot be performed in some cases. If the content exceeds 98% by weight, the content of the dye or the like becomes too low in some cases. The content is more preferably 30 to 97% by weight, and much more preferably 40 to 95% by weight.

The black ink contains water-soluble polyvalent alcohol alykyl ether. The water-soluble polyvalent alcohol alkyl ether serves as a permeating agent which increases the drying performance of the ink on the paper surface by effectively increasing the speed at which the ink permeates into the recording paper, thus preventing the bleeding caused by the slow drying of the ink on the paper, and is effective in preventing the feathering accompanied by the permeation (whisker-shaped blurring along the paper fiber). The water-soluble polyvalent alcohol alykyl ether is not specifically limited, and may include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, tripropylene glycol monobutyl ether.

The content of the water-soluble polyvalent alcohol alkyl ether in the black ink is preferably 0.3 to 5% by weight with respect to the total amount of the ink. If the content is less than 0.3% by weight, then the permeating effect is insufficient, the speed at which the ink permeates into the recording paper is slow, and the drying time becomes longer, thereby causing blurring in some cases. If the contents exceed 5% by weight, the speed at which the ink permeates into the recording paper becomes too fast, and the sharp edge of image area or line area such as letters or ruled lines are lost in some cases. The content is more preferably 0.5 to 3% by weight.

It is preferable that the black ink contains a moistening agent such as glycerol in order to principally prevent the drying-up and the occurrence of deposition from the ink at the tip portion of the ink-jet head. The content of the moistening agent in the black ink with respect to the total amount of the ink is preferably 5 to 40% by weight. If the content is less than 5% by weight, then the moistening function is insufficient, and the deposition and the drying-up cannot be prevented in some cases. If the content exceeds 40% by weight, the viscosity of the ink is unnecessarily increased. As a result, any problem may arise in some cases such that the discharge cannot be performed and/or the ink is dried on the recording paper extremely slowly. The content is more preferably 7 to 10% by weight.

The black ink may contain, to the extent that the purposes of the present invention are not hindered, conventionally known additives such as resin binders, dispersants, surfactants, viscosity-adjusting agents, surface tension-adjusting agents, pH-adjusting agents, dye-dissolving agents, antiseptic/fungicidal agents, and rustproofing or rust preventing agents. In addition, when the water base ink for ink-jet recording of the present invention is applied to the ink-jet system in which the ink is discharged in accordance with the action of the thermal energy, thermal physical values including, for example, the specific heat, the coefficient of thermal expansion, and the coefficient of thermal conductivity may be adjusted in some cases.

The yellow ink contains the water-soluble anionic yellow dye in which a number of counter ion or ions is not more than 3 per one molecule. Namely, with respect to the self-dispersing black pigment which is a pigment charged to have a negative charge, an anionic dye is selected of which counter ion is positive ion or cation. Such a water-soluble anionic yellow dye may specifically include, for example, C. I. (Color Index Number) Acid Yellow 23, C. I. Direct Yellow 132, C. I. Food Yellow 3. These dyes may be used singly, or two or more of the dyes may be used in combination. Further, the counter ion in the yellow dye may be mainly $Na^+$.

The water-soluble yellow dye is contained in the yellow ink in an amount of 1 to 5% by weight with respect to the total amount of the ink. If the content of the water-soluble yellow dye is less than 1% by weight, the color vividness and the color density are not sufficient and the bleeding occurs in some cases. If the content exceeds 5% by weight, the coagulation of the pigment is caused when the yellow ink contacts with the black ink. The content is preferably 1.5 to 4.5% by weight, more preferably 2 to 4% by weight. The amount of the dye contained in the yellow ink may be varied in accordance with the amount of the pigment contained in the black ink. For example, a weight ratio of the amount of the pigment contained in the black ink is preferably 1.5 to 2 with respect to the amount of the dye contained in the yellow ink.

The yellow ink contains, as the permeating agent, the surfactant based on amine represented by the foregoing general formula (1). The surfactant based on amine represented by the foregoing general formula (1) has appropriate surface action function and is capable of providing sufficient permeability to the ink. In addition, the surfactant has an amine structure containing a nitrogen atom. Accordingly, the ink containing the surfactant is alkaline or exhibits alkalinity. When an image is printed with the alkaline ink, printing paper having an acidic or neutral printing surface is generally used for the ink-jet printer. Accordingly, the moment the ink makes contact with the paper surface, the dye in the ink is destabilized due to the difference in pH between the printing surface and the ink, and the dye sufficiently entwines with the fibers of the recording paper, thereby realizing the vivid reproduction of colors. Accordingly, the yellow ink using the surfactant based on amine represented by the foregoing general formula (1) is capable of sufficiently permeating into the paper fibers and the dye sufficiently entwines with the paper fibers, thereby preventing the bleeding at the printing boundary with the black ink. Thus, it is possible to maintain a high printing quality.

The surfactant based on amine represented by the foregoing general formula (1) is not specifically limited and may include, for example, polyoxyethylene alkyl amines such as polyoxyethylene oleyl amine, polyoxyethyele lauryl amine. Among the foregoing, those commercially available include, for example, ETHOMEEN C/15 (x+y=5), ETHOMEEN C/20 (x+y=10), ETHOMEEN C/25 (x+y=15), ETHOMEEN S/15 (x+y=5), ETHOMEEN S/20 (x+y=10), ETHOMEEN S/25 (x+y=15), ETHOMEEN T/15 (x+y=5), ETHOMEEN T/20 (x+y=10), ETHOMEEN T/25 (x+y=15) (respectively produced by Lion Akzo Co. Ltd.). These ETHOMEENs are an ethylene oxide condensation products of the primary fatty amines, and are in a form of a mixture or composition of amines represented by the general formula (1) each having a different number of carbons. For example, ETHOMEEN C/15 is a mixture of the compounds represented by the general formula (1) in which x+y=5 and R=C8 to C18, and is derived from coconut oil. The ETHOMEENs as described above are available from Lion Akzo Co. Ltd.

It is preferable that the surfactant based on amine represented by the foregoing general formula (1) is contained in the yellow ink in an amount of 0.01 to 1% by weight with respect to the total amount of the ink. If the content of the surfactant based on amine represented by the foregoing general formula (1) is less than 0.01% by weight, any sufficient permeating function cannot be obtained in some cases. If the content exceeds 1% by weight, the dispersion of the pigment in the black ink may be deteriorated when the black and yellow inks contact with each other. The content is more preferably 0.1 to 0.5% by weight.

The yellow ink contains water-soluble polyvalent alcohol alkyl ether. The surfactant based on amine represented by the foregoing general formula (1), if contained in great amount, deteriorates the dispersion of the pigment in the black ink in some cases when the yellow ink contacts with the black ink. By using the water-soluble polyvalent alcohol alkyl ether in combination, it is possible to supplement the permeability, which would be otherwise insufficient if only the above surfactant based on amine were used. Accordingly, higher printing performance can be realized. In addition, by effectively using the surfactant based on amine and the water-soluble polyvalent alcohol alkyl ether in combination, it is possible to suppress the total amount of the permeating agent to be low. Accordingly, the other components such as a moistening agent, which are necessary to constitute the ink, may have an increased freedom (flexibility) in the usage amount, and it is possible to increase the reliability of the ink as a whole.

The water-soluble polyvalent alcohol alkyl ether contained in the yellow ink is preferably the same as that contained in the black ink. By containing the same water-soluble polyvalent alcohol alkyl ethers, most of the major components in the black and yellow inks becomes common, and it is possible to obtain an effect of decreasing the solvent shock which triggers off the coagulation of the pigment in the black ink when the black and yellow inks contact with each other.

The water-soluble polyvalent alcohol alkyl ether is contained in the yellow ink in an amount of 2 to 5% by weight with respect to the total amount of the ink. If the content of the water-soluble polyvalent alcohol alkyl ether is less than 2% by weight, the permeating effect is insufficient, the speed at which the ink permeates into the paper is slow, the drying time is prolonged, and blurring may be caused in some cases. If the content exceeds 5% by weight, a hydrophobic group, possessed by the water-soluble polyvalent alcohol alkyl ether, acts on the surface of the black pigment which also exhibit the hydrophobic property, thereby causing the coagulation.

The yellow ink uses water as the solvent. The kinds and the content amount of the water are same as described regarding the black ink. The yellow ink preferably contains a moistening agent such as glycerol in order to principally prevent the drying-up of the ink and the occurrence of deposition from the ink at the tip portion of the ink-jet head. The content of the moistening agent is same as described regarding the black ink. The yellow ink may contain, to the extent that the purpose of the present invention is not hindered, conventionally known additives such as resin binders, dispersants, surfactants, viscosity-adjusting agents, surface tension-adjusting agent, pH-adjusting agents, dye-dissolving agents, antiseptic/fungicidal agents, and rust-proofing or rust preventing agents. In addition, when the water base ink set for ink-jet recording of the present invention is applied to the ink-jet system in which the ink is discharged in accordance with the action of the thermal energy, thermal physical values including, for example, the specific heat, the coefficient of thermal expansion, and the coefficient of thermal conductivity may be adjusted in some cases.

The water base ink set for ink-jet recording of the present invention includes at least the black ink and the yellow ink as described above. In addition, a magenta ink, a cyan ink or the like which satisfy performance sufficient for the water base ink for ink-jet recording may be used in combination with the black and yellow inks.

According to the present invention, there is also provided an ink cartridge including the ink set of the present invention. The ink cartridge has at least the black ink and the yellow ink of the ink set, and a cartridge case having compartments in which the black and yellow inks are separately accommodated. In a case that the ink set has inks with four colors including the yellow ink and the black ink, the cartridge case may be divided into four compartments. Alternatively, the ink cartridge may be a set of individual ink cartridges containing the inks respectively, namely a set of cartridge cases including a cartridge case accommodating the black ink and a cartridge case accommodating the yellow ink. In a case that the ink set has inks with four colors including the yellow ink and the black ink, the cartridge case may be a set including four cartridge cases. The ink cartridge may be of the type capable of being detachably attached to an ink head, or the type capable of being detachably attached to a frame of an ink-jet printer. In the case of the latter, the ink is supplied from the ink cartridge to a printing head via a flexible ink tube.

Since the present invention is constituted as described above, it is possible to provide the water base ink set for ink-jet recording in which both of an image with vivid color possessed by a dye ink and an image with high density and high contrast possessed by a pigment ink are satisfied, and in which no coagulation of pigment and no bleeding occur.

DESCRIPTION OF THE PREFERRED EMBODIMENTS

The present invention will be explained in further detail below as exemplified by Examples. However, the present invention is not limited only to the Examples.

EXAMPLE 1

A black ink was prepared by mixing and agitating 30% by weight of CAB-O-JET 300 (produced by Cabbot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Acid Yellow 23 (number of counter ions per one molecule: 3) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 5% by weight of triethylene glycol-n-butyl ether as water-soluble polyvalent alcohol alkyl ether, and 61.8% by weight of pure water. The obtained black and yellow inks were used in combination for a water base ink set for ink-jet recording.

EXAMPLE 2

A black ink was prepared by mixing and agitating 30% by weight of CAB-O-JET 300 (manufactured by Cabot, solid content: 15% by weight) as self-dispersing black pigment, 28% by weight of glycerol, 0.5% by weight of triethylene glycol-n-butyl ether and 0.5% by weight of tripropylene glycol-n-butyl ether as water-soluble polyvalent alcohol alkyl ethers, and 41% by weight of pure water. A yellow ink was prepared by mixing and agitating 2.5% by weight of C. I. Direct Yellow 132 (number of counter ions per one molecule: 2) as water-soluble yellow dye, 30% by weight of glycerol, 0.15% by weight of ETHOMEEN C/15 (manufactured by Lion Akzo Co. Ltd.; R=C 8 to 18, x+y=5 in the foregoing general formula (1)) as surfactant based on amine, 4% by weight of triethylene glycol-n-butyl ether and 0.2% by weight of tripropylene glycol-n-butyl ether as water-soluble polyvalent alcohol alkyl ethers, and 63.15% by weight of pure water. The obtained black and yellow inks were used in combination for a water base ink set for ink-jet recording.

EXAMPLE 3

A black ink was prepared by mixing and agitating 25% by weight of LIOJET BLACK 002C (manufactured by Toyo Ink, Ltd., solid content: 20% by weight) as self-dispersing black pigment, 20% by weight of glycerol, 0.7% by weight of dipropylene glycol-n-propyl ether as water-soluble polyvalent alcohol alkyl ether, and 54.3% by weight of pure water. A yellow ink was prepared by mixing and agitating 2% by weight of C. I. Acid Yellow 23 (number of counter ions per one molecule: 3) and 0.5% by weight of C. I. Food Yellow 3 (number of counter ion per one molecule: 2) as water-soluble yellow dyes, 25% by weight of glycerol, 0.2% by weight of ETHOMEEN S/15 (manufactured by Lion Akzo Co. Ltd.; R=C 14 to 18, x+y=5 in the foregoing general formula (1)) as surfactant based on amine, 2% by weight of dipropylene glycol-n-propyl ether as water-soluble polyvalent alcohol alkyl ether, and 70.3% by weight of pure water. The obtained black and yellow inks were used in combination for a water base ink set for ink-jet recording.

COMPARATIVE EXAMPLE 1

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Direct Yellow 86 (number of counter ions per one molecule: 4) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 5% by weight of triethylene glycol-n-butyl ether as water-soluble polyvalent alcohol alkyl ether, and 61.8% by weight of pure water. The obtained black and yellow inks were used in combination for a water base ink set for ink-jet recording.

COMPARATIVE EXAMPLE 2

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 7% by weight of C. I. Acid Yellow 23 (number of counter ions per one molecule: 3) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 5% by weight of triethylene glycol-n-butyl ether as water-soluble polyvalent alcohol alkyl ether, and 57.8% by weight of pure water. The obtained black and yellow inks used in combination for a water base ink set for ink-jet recording.

COMPARATIVE EXAMPLE 3

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Acid Yellow 23 (number of counter ions per one molecule: 3) as water-soluble yellow dye, 30% by weight of glycerol, 5% by weight of triethylene glycol-n-butyl ether as water-soluble polyvalent alcohol alkyl ether, and 62% by weight of pure water. The obtained black and yellow inks were used in combination for a water base ink set for ink-jet recording.

COMPARATIVE EXAMPLE 4

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Acid Yellow 23 (number of counter ions per one molecule: 3) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 1% by weight of triethylene glycol-n-butyl ether as water-soluble polyvalent alcohol alkyl ether, and 65.8% by weight of pure water. The obtained black and yellow inks were used in combination for a water base ink set for ink-jet recording.

COMPARATIVE EXAMPLE 5

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Acid Yellow 23 (number of counter ions per one molecule: 3) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 8% by weight of triethylene glycol-n-butyl ether as water-soluble polyvalent alcohol alkyl ether, and 58.8% by weight of pure water. The obtained black and yellow inks were used in combination for a water base ink set for ink-jet recording.

COMPARATIVE EXAMPLE 6

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 3% by weight of C. I. Acid Yellow 23 (number of counter ions per one molecule: 3) as water-soluble yellow dye, 30% by weight of glycerol, 2% by weight of tripropylene glycol-n-propyl ether as water-soluble polyvalent alcohol alkyl ether, and 65% by weight of pure water. The obtained black and yellow inks were used in combination for a water base ink set for ink-jet recording.

COMPARATIVE EXAMPLE 7

A black ink was prepared by mixing and agitating 30% by weight of CAB-O-JET 300 (manufactured by Cabot, solid content: 15% by weight) as self-dispersing black pigment, 28% by weight of glycerol, 0.3% by weight of ETHOMEEN C/25 (manufactured by Lion Akzo Co. Ltd.; R=C 8 to 18, x+y=15 in the foregoing general formula (1)) as surfactant based on amine, and 41.7% by weight of pure water. A yellow ink was prepared by mixing and agitating 3% by weight of C. I. Acid Yellow 23 (number of counter ions per one molecule: 3) as water-soluble yellow dye, 30% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 5% by weight of triethylene glycol-n-butyl ether as water-soluble polyvalent alcohol alkyl ether, and 61.8% by weight of pure water. The obtained black and yellow inks were used in combination for a water base ink set for ink-jet recording.

COMPARATIVE EXAMPLE 8

A black ink was prepared by mixing and agitating 30% by weight of CAB-O-JET 300 (manufactured by Cabot, solid content: 15% by weight) as self-dispersing black pigment, 28% by weight of glycerol, 1% by weight of triethylene glycol-n-butyl ether as water-soluble polyvalent alcohol alkyl ether, and 41% by weight of pure water. A yellow ink was prepared by mixing and agitating 1.5% by weight of C. I. Acid Yellow 86 (number of counter ions per one molecule: 4) as water-soluble yellow dye, 35% by weight of glycerol, 0.2% by weight of ETHOMEEN C/25 (manufactured by Lion Akzo Co. Ltd.; R=C 8 to 18, x+y=15 in the foregoing general formula (1)) as surfactant based on amine, 5% by weight of triethylene glycol-n-butyl ether as water-soluble polyvalent alcohol alkyl ether, and 58.3% by weight of pure water. The obtained black and yellow inks were used in combination for a water base ink set for ink-jet recording.

EVALUATION

The ink sets for ink-jet recording obtained in Examples 1 to 3 and Comparative Examples 1 to 8, respectively, were evaluated in accordance with the following methods. The results of evaluation are shown in Table 1.

(1) Evaluation of Bleeding

The obtained water base ink sets for ink-jet recording were respectively used to perform printing of image on Multi USE 20 PAPER manufactured by Great White as the recording paper with an ink-jet printer MFC-3100C (produced by Brother Industries, Ltd.) as the apparatus for evaluation. With respect to each of the ink sets, a rag at the boundary portion between the black and yellow inks was measured with the method pursuant to ISO 13660. The "rag" in the evaluation means the raggedness of line defined in ISO 13660, and a ragged line means a state in which a line heaves or is jaggy compared with an ideal line edge which should be normally smooth and straight. The evaluation was made based on the obtained rags in accordance with the following criteria:

+: increase in rag in a line at a boundary portion between the black and yellow inks was less than 5 with respect to rag in a single line printed with a black ink;

±: increase in rag in a line at a boundary portion between the black and yellow inks was not less than 5 and less than 10 with respect to rag in a single line printed with a black ink; and −: increase in rag in a line at a boundary portion between the black and yellow inks was not less than 10 with respect to rags in a single line printed with a black ink.

(2) Evaluation of Color

Printed articles were obtained with the same method as used for the evaluation of bleeding. For each of the articles, the color developability of the printed portion with the yellow ink was visually observed. The evaluation was made in accordance with the following criteria:

+: sufficiently vivid color and printing density were obtained; and

−: color was not sufficiently vivid or printing density was low.

(3) Evaluation by Microscopic Observation

The yellow ink and black ink of each of the obtained water base ink sets for ink-jet recording were used for the evaluation by microscopic observation as follows. For each of the ink set, one ink droplet of the black ink and one ink droplet of the yellow ink were dropped onto a slide glass separately from each other. A cover glass was then gently placed on the slide glass to make the droplets of black ink and yellow ink contact with each other. The contact border, in which the two droplets made contact with each other, was observed with a microscope in order to observe a presence or absence of the coagulation of pigment. The evaluation was made in accordance with the following criteria:

+: no coagulation was observed in the contact border;

±: although coagulation of the black pigment in the black ink was observed in the contact border, the flow property was not affected; and −: the black pigment of the black ink was coagulated and solidified in the contact border, thereby losing the flow property.

(4) Evaluation of Nozzle Clog-up

For each of the obtained water base ink sets for ink-jet recording, a continuous wiping test of the head nozzle surface was carried out 3,000 times at room temperature by using an ink-jet printer MFC-3100C (produced by Brother Industries, Ltd.) as the apparatus for evaluation. The discharge state after the test was visually observed, and the evaluation was made in accordance with the following criteria. The apparatus for evaluation has such a wiping mechanism that nozzle arrays for discharging the black ink and the yellow ink, respectively, are wiped simultaneously in the lateral direction. Due to the simultaneous wiping, the black ink and the color inks can contact with each other to mix.

+: the discharge failure and the curvature of discharged ink after the wiping test were not found at all;

±: the discharge failure and the curvature of discharged ink after the wiping test were found slightly, but the restoration was successful by the purge within five times; and −: the discharge failure and the curvature of discharged ink after the wiping test were found, and the restoration was unsuccessful by the purge.

(5) Evaluation of Suction Pump Durability

For each of the obtained water base ink sets for ink-jet recording, a continuous suction purge test was carried out 10,000 times at room temperature. An ink-jet printer MFC-3100C (produced by Brother Industries, Ltd.) was used for the evaluation. The amount of suction per one time was evaluated in accordance with the following criteria:

++: The amount of suction per one time was within a range of 0.26 to 0.30 cc as the prescribed amount in the continuous suction purge performed 10,000 times.

+: The amount of suction per one time was not more than 0.26 cc as the lower limit value of the prescribed amount in the continuous suction purge performed 10,000 times. However, the amount of suction per one time was within a range of 0.26 to 0.30 cc as the prescribed amount in the continuous suction purge performed 5,000 times.

±: The amount of suction per one time was not more than 0.26 cc as the lower limit value of the prescribed amount in the continuous suction purge performed 5,000 times. However, the amount of suction per one time was within a range of 0.26 to 0.30 cc as the prescribed amount in the continuous suction purge performed 3,000 times.

−: The amount of suction per one time was not more than 0.26 cc as the lower limit value of the prescribed amount in the continuous suction purge performed 3,000 times.

TABLE 1

| | Evaluation of bleeding | Evaluation of color | Evaluation by microscopic observation | Evaluation of nozzle clog-up | Evaluation of suction pump durability |
|---|---|---|---|---|---|
| Example 1 | + | + | + | + | ++ |
| Example 2 | + | + | + | + | + |
| Example 3 | + | + | + | + | ++ |
| Comp. Ex. 1 | + | + | ± | − | − |
| Comp. Ex. 2 | + | + | ± | − | − |
| Comp. Ex. 3 | − | + | + | + | ++ |
| Comp. Ex. 4 | ± | + | + | + | ++ |
| Comp. Ex. 5 | ± | + | ± | − | − |
| Comp. Ex. 6 | − | + | + | + | + |
| Comp. Ex. 7 | − | + | ± | − | − |
| Comp. Ex. 8 | + | − | ± | ± | ± |

From Table 1, it is appreciated that with respect to the ink sets prepared in Examples 1 to 3, satisfactory results were successfully obtained in all of the evaluations. On the other hand, the evaluation of nozzle clog-up was not good for the ink set of Comparative Example 1. The reason is considered that the counter ion of the yellow ink is quadrivalent in Comparative Example 1. However, the evaluation of nozzle clog-up was also not good for the ink sets of Comparative Example 2, 5 and 7 in which the counter ion of the yellow ink is tervalent, respectively. With respect to Comparative Example 2, the reason is considered that the amount of the water-soluble yellow dye is 7% by weight. With respect to Comparative Example 5, the reason is considered that the amount of water-soluble polyvalent alcohol contained in the yellow ink is 8% by weight. With respect to Comparative Example 7, the reason is considered that the water-soluble polyvalent alcohol is not contained in the black ink. From these evaluation results, it is appreciated that the water-soluble polyvalent alcohol alkyl ether is necessary to the black ink, and that the amount of the water-soluble yellow dye and the amount of the water-soluble polyvalent alcohol alkyl ether in the yellow ink should also be appropriate, respectively. In addition, from the evaluation results for Comparative Examples 3 and 6, it is appreciated that the addition of ETHOMEEN is necessary in order to suppress the bleeding.

In these Examples, the ink set having the black and yellow inks were specifically explained. However, the present invention may be applied to an ink set having inks with four colors including a black ink, a yellow ink, a magenta ink and a cyan ink. Alternatively, the present invention may be applied to an ink set having a multiple of colors with not less than five colors. In a case that such an ink set with four colors or multiple colors, a color ink other than the black ink may contain a water-soluble anionic color dye, the surfactant based on the amine represented by the general formula (1) and the water-soluble polyvalent alcohol alkyl ether, and satisfy the same condition as satisfied by the yellow ink of the present invention.

Another example of the surfactant based on amine represented by the formula (1) and a structure of the ink cartridge usable in the present invention are disclosed in U.S. Pat. No. 6,758,889 B2, a content of which has been incorporated herein by reference.

According to the present invention, it is possible to provide the water base ink set for ink-jet recording in which both of the image of vivid color possessed by the dye ink and the image of high density and high contrast possessed by the pigment ink are satisfied, and no bleeding or no coagulation of pigment occur.

What is claimed is:

1. A water base ink set for ink-jet recording including:
   a black ink containing a self-dispersing black pigment, which is dispersed in a solvent by having a negative charge, and a water-soluble polyvalent alcohol alkyl ether; and
   a yellow ink containing a water-soluble anionic yellow dye in which a number of counter ion or ions per one molecule is not more than 3, a surfactant based on amine represented by the following general formula (1), and a water-soluble polyvalent alcohol alkyl ether;
   wherein an amount of the self-dispersing black pigment contained in the black ink is 0.1 to 20% by weight;
   an amount of the water-soluble anionic yellow dye contained in the yellow ink is 1 to 5% by weight, and an amount of the water-soluble polyvalent alcohol alkyl ether contained in the yellow ink is 2 to 5% by weight; and
   the water-soluble polyvalent alcohol alkyl ether is at least one selected from the group consisting of dipropylene glycol-n-propyl ether, triethylene glycol-n-butyl ether and tripropylene glycol-n-butyl ether;

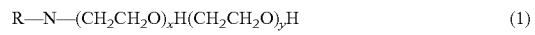

$$R\text{—}N\text{—}(CH_2CH_2O)_xH(CH_2CH_2O)_yH \qquad (1)$$

wherein R represents an alkyl group or an alkenyl group having a number of carbons of 8 to 18, and x+y is 5 to 15.

2. The water base ink set for ink-jet recording according to claim 1, wherein the water-soluble polyvalent alcohol alkyl ether contained in the black ink and the water-soluble polyvalent alcohol alkyl ether contained in the yellow ink are same.

3. A water base ink set for ink-jet recording including:
   a black ink containing a self-dispersing black pigment, which is dispersed in a solvent by having a negative charge, and a water-soluble polyvalent alcohol alkyl ether; and
   a yellow ink containing a water-soluble anionic yellow dye in which a number of counter ion or ions per one molecule is not more than 3, a surfactant based on amine represented by the following general formula (1), and a water-soluble polyvalent alcohol alkyl ether;
   wherein an amount of the self-dispersing black pigment contained in the black ink is 0.1 to 20% by weight;
   an amount of the water-soluble anionic yellow dye contained in the yellow ink is 1 to 5% by weight, and an amount of the water-soluble polyvalent alcohol alkyl ether contained in the yellow ink is 2 to 5% by weight; and the black ink contains no surfactant based on amine represented by the general formula (1);

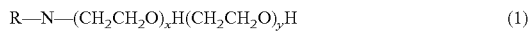# (1)
R—N—(CH$_2$CH$_2$O)$_x$H(CH$_2$CH$_2$O)$_y$H wherein R represents an alkyl group or an alkenyl group having a number of carbons of 8 to 18, and x+y is 5 to 15.

4. The water base ink set for ink-jet recording according to claim 1, wherein the water-soluble anionic yellow dye is one selected from the group consisting of C. I. Acid Yellow 23, C. I. Direct Yellow 132 and C. I. Food Yellow 3.

5. The water base ink set for ink-jet recording according to claim 1, wherein the surfactant based on amine represented by the general formula (1) is contained in the yellow ink in an amount of 0.01 to 1% by weight.

6. The water base ink set for ink-jet recording according to claim 1, wherein the water-soluble polyvalent alcohol alkyl ether is contained in the black ink in an amount of 0.3 to 5% by weight.

7. The water base ink set for ink-jet recording according to claim 1, wherein a weight ratio of the amount of the self-dispersing black pigment contained in the black ink is 1.5 to 2 with respect to the amount of the water-soluble anionic yellow dye contained in the yellow ink.

8. An ink cartridge comprising the water base ink set for ink-jet recording as defined in claim 1.

9. The water base ink set for ink-jet recording according to claim 3, wherein the water-soluble polyvalent alcohol alkyl ether contained in the black ink and the water-soluble polyvalent alcohol alkyl ether contained in the yellow ink are same.

10. The water base ink set for ink-jet recording according to claim 3, wherein the water-soluble anionic yellow dye is one selected from the group consisting of C. I. Acid Yellow 23, C. I. Direct Yellow 132 and C. I. Food Yellow 3.

11. The water base ink set for ink-jet recording according to claim 3, wherein the surfactant based on amine represented by the general formula (1) is contained in the yellow ink in an amount of 0.01 to 1% by weight.

12. The water base ink set for ink-jet recording according to claim 3, wherein the water-soluble polyvalent alcohol alkyl ether is contained in the black ink in an amount of 0.3 to 5% by weight.

13. The water base ink set for ink-jet recording according to claim 3, wherein a weight ratio of the amount of the self-dispersing black pigment contained in the black ink is 1.5 to 2 with respect to the amount of the water-soluble anionic yellow dye contained in the yellow ink.

14. An ink cartridge comprising the water base ink set for ink-jet recording as defined in claim 3.

* * * * *